United States Patent
Koui et al.

(10) Patent No.: US 8,824,104 B1
(45) Date of Patent: Sep. 2, 2014

(54) MAGNETIC HEAD AND MAGNETIC RECORDING/REPRODUCING DEVICE

(71) Applicant: Kabushiki Kaisha Toshiba, Tokyo (JP)

(72) Inventors: Katsuhiko Koui, Yokohama (JP); Shuichi Murakami, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/047,359

(22) Filed: Oct. 7, 2013

(30) Foreign Application Priority Data

Jun. 28, 2013 (JP) .................. 2013-137212

(51) Int. Cl.
  *G11B 5/127* (2006.01)
(52) U.S. Cl.
  USPC ...................................... 360/125.3
(58) Field of Classification Search
  USPC ...................................... 360/125.3
  See application file for complete search history.

(56) References Cited

U.S. PATENT DOCUMENTS

| | | | | |
|---|---|---|---|---|
| 7,791,829 B2 * | 9/2010 | Takeo et al. | ...................... | 360/55 |
| 7,957,098 B2 * | 6/2011 | Yamada et al. | ............ | 360/125.3 |
| 8,081,397 B2 * | 12/2011 | Funayama et al. | ........ | 360/125.08 |
| 8,238,060 B2 * | 8/2012 | Yamada et al. | ............ | 360/125.3 |
| 8,295,009 B2 * | 10/2012 | Yamada et al. | ............ | 360/125.3 |
| 8,614,861 B1 * | 12/2013 | Tomoda et al. | ............ | 360/125.3 |
| 2009/0257151 A1 | 10/2009 | Zhang et al. | | |
| 2010/0188771 A1 | 7/2010 | Okamura et al. | | |
| 2013/0029182 A1 | 1/2013 | Zhang et al. | | |

OTHER PUBLICATIONS

Wang, Wenhong, et al., "Perpendicular Magnetic Anisotropy of Co$_2$FeAl/Pt Multilayers for Spintronic Devices," Applied Physics Express, Aug. 27, 2010, pp. 1-3, vol. 3—iss.9—art.093002.

* cited by examiner

*Primary Examiner* — Mark Blouin
(74) *Attorney, Agent, or Firm* — Knobbe Martens Olson & Bear LLP

(57) ABSTRACT

According to one embodiment, a magnetic head according to the embodiment includes a main magnetic pole, a spin torque oscillator, and an auxiliary magnetic pole. The spin torque oscillator includes a spin injection layer, a nonmagnetic intermediate layer, and an oscillation layer. The spin injection layer has an artificial lattice film obtained by stacking a first metal layer of a Heusler alloy and a second metal layer including at least one of platinum, palladium, and nickel two times or more repeatedly, and the first metal layer has a thickness of 0.3 to 3.5 nm.

6 Claims, 3 Drawing Sheets

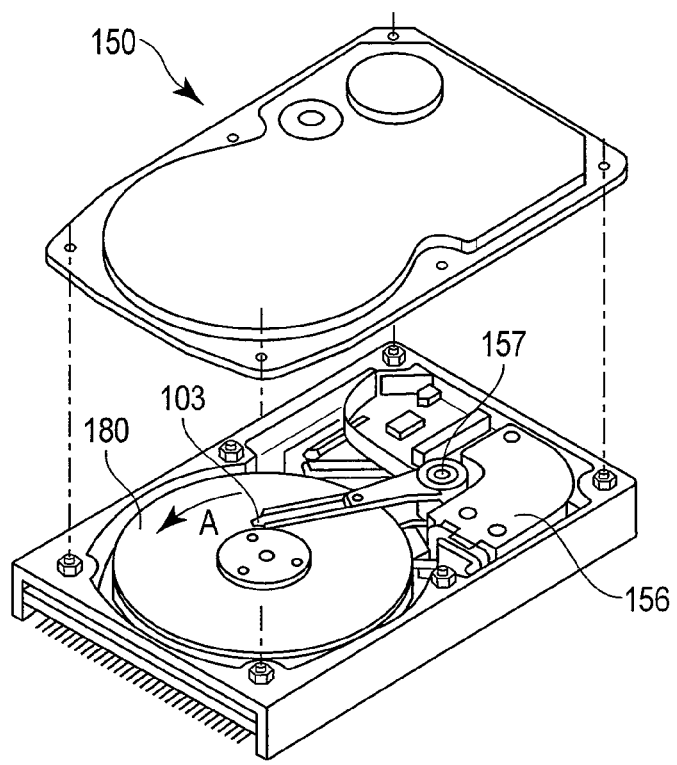
F I G. 3
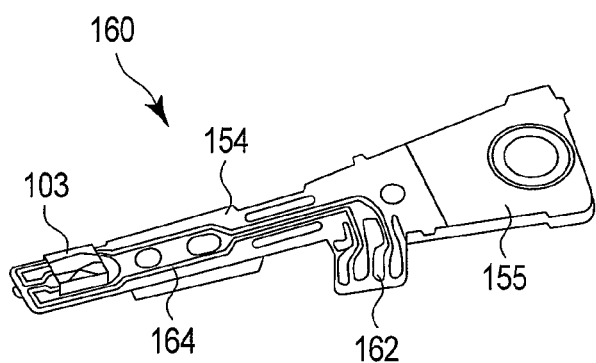
F I G. 4

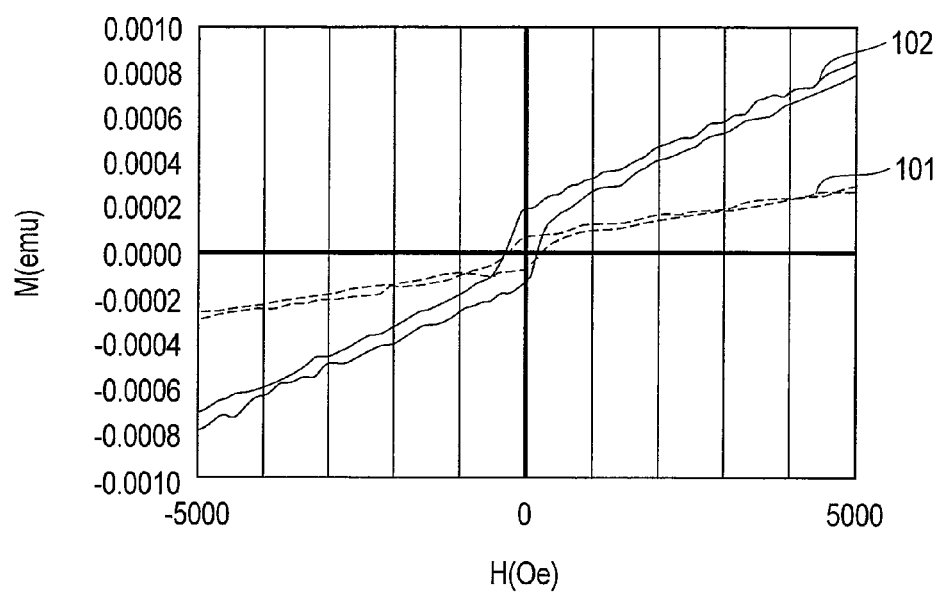
F I G. 5

MAGNETIC HEAD AND MAGNETIC RECORDING/REPRODUCING DEVICE

CROSS-REFERENCE TO RELATED APPLICATIONS

This application is based upon and claims the benefit of priority from Japanese Patent Application No. 2013-137212, filed Jun. 28, 2013, the entire contents of which are incorporated herein by reference.

FIELD

Embodiments described herein relate generally to a magnetic head and a magnetic recording/reproducing device.

BACKGROUND

In the 1990s, the practical application of an MR (Magneto-Resistive effect) head and a GMR (Giant Magneto-Resistive effect) head triggers a dramatic increase in a recording density and a recording capacity of an HDD (Hard Disk Drive). However, since the beginning of the 2000s, a problem of thermal fluctuation of a magnetic recording medium is exposed, and therefore, a rate of increase in the recording density temporarily slows down. Still, recently, the HDD recording density has been increasing about 40% per annum, as the perpendicular magnetic recording more advantageous, in principle, for high-density recording than longitudinal magnetic recording was put into practical use in 2005.

However, the realization of such a high recording density is considered not easy even by using a perpendicular magnetic recording method, because the problem of thermal fluctuation is exposed again.

As a recording method to solve the above problem, a "high-frequency magnetic field assisted magnetic recording method" has been suggested. In the high-frequency assisted magnetic recording method, a high-frequency magnetic field at a frequency in the neighborhood of the resonant frequency of a magnetic recording medium, which is sufficiently higher than the recording signal frequency, is locally applied to the magnetic recording medium. As a result, the magnetic recording medium resonates, and the coercivity (Hc) of the magnetic recording medium subjected to the application of the high-frequency magnetic field is reduced to not more than half the original value. Thus, the high high-frequency magnetic field is overlapped with the recording magnetic field, whereby magnetic recording on a magnetic recording medium having a higher coercivity (Hc) and a higher magnetic anisotropy energy (Ku) is allowed.

However, it is necessary to apply a large current to a spin torque oscillator (STO) as a source to generate a high frequency for high-frequency magnetic field assisted recording. Accordingly, the generated Joule heat results in difficulty in obtaining long-term reliability. In order to increase, particularly high-frequency magnetic field intensity, a demand for a large current is increased as a magnetovolume (Mst) of an oscillation layer (FGL) is increased. Consequently, it is desired to reduce the oscillation drive voltage of the STO and achieve a strong high-frequency magnetic field and long-term reliability.

BRIEF DESCRIPTION OF THE DRAWINGS

FIG. 3 is a main part perspective view illustrating an outline configuration of a magnetic recording/reproducing device on which the magnetic head according to the embodiment can be mounted;

FIG. 4 is a schematic view showing an example of a magnetic head assembly according to one embodiment; and FIG. 5 is a view showing M-H curves of an SIL layer used in one embodiment.

DETAILED DESCRIPTION

Figure 1:
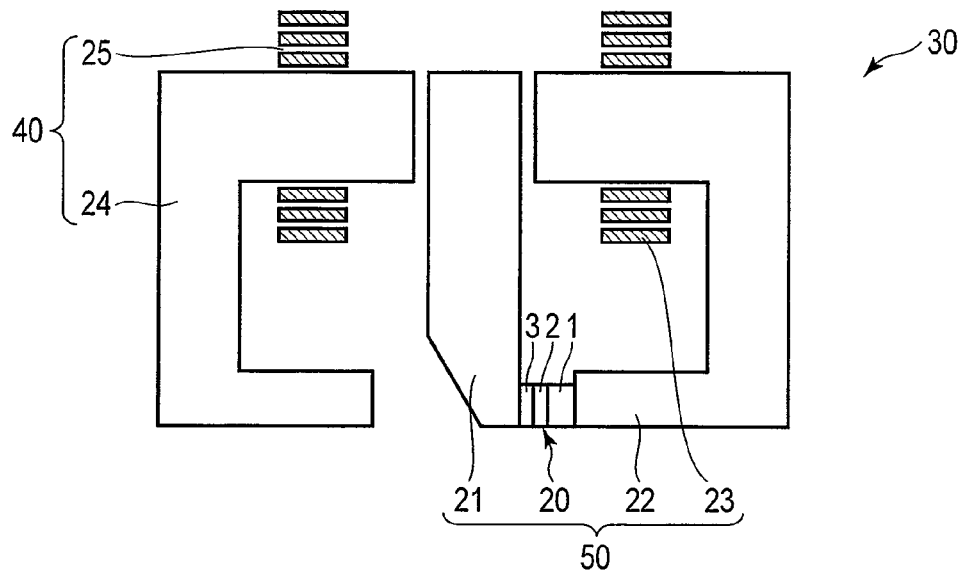
FIG. 1 is a view showing an exemplary configuration of a magnetic head according to one embodiment.

In general, according to one embodiment, a high-frequency assisted magnetic head includes a main magnetic pole which applies a record magnetic field to a magnetic recording medium,
    an auxiliary magnetic pole for forming a magnetic circuit together with the main magnetic pole, and
    a spin torque oscillator (STO) formed between the main magnetic pole and the auxiliary magnetic pole.

The spin torque oscillator includes a spin injection layer (SIL) formed on one of the main magnetic pole and the auxiliary magnetic pole, a nonmagnetic intermediate layer formed on the spin injection layer, and an oscillation layer (FGL) formed on the nonmagnetic intermediate layer, and
    the spin injection layer has an artificial lattice film obtained by stacking a first metal layer of a Heusler alloy and a second metal layer which is formed on the first metal layer and includes at least one of Pt, Pd, and Ni two times or more repeatedly.

The first metal layer has a thickness of 0.3 to 3.5 nm.

According to an embodiment, each of the Heusler alloys is formed as an artificial lattice with a metal layer containing at least one of Pt, Pd, and Ni so that perpendicular magnetic anisotropy (Hk) required for the spin torque oscillator and the high spin polarizability (Po) can be achieved. Accordingly, a higher frequency field is obtained, and the oscillation drive voltage of the spin torque oscillator can be reduced.

A Heusler alloy is an alloy represented by the composition formula ABC (A, B, and C represent elements respectively). The use of a specific element allows higher spin polarizability (Po) to be obtained. For example, if it is produced in any one of three composition ranges below, higher spin polarizability can be obtained.

(1) A is 40 to 60 atomic % of Co, B is 20 to 30 atomic % of an Fe—Mn alloy, C is 20 to 30 atomic % of Si, and the total of A, B, and C is 100 atomic %;

(2) A is 40 to 60 atomic % of Co, B is 20 to 30 atomic % of Fe, C is 20 to 30 atomic % of an Al—Si alloy, and the total of A, B, and C is 100 atomic %; and (3) A is 40 to 60 atomic % of Co, B is 20 to 30 atomic % of Fe, C is 20 to 30 atomic % of a Ga—Ge alloy, and the total of A, B, and C is 100 atomic %.

An artificial lattice of a first metal layer of any of these Heusler alloys with a second metal layer including at least one of Pt, Pd, and Ni is formed so that the perpendicular magnetic anisotropy required for the STO and the high spin polarizability (Po) can be achieved.

Generally, the spin torque oscillator (STO) has a structure in which the in-plane direction is a longitudinal direction from restrictions of a distance between the main magnetic pole and the auxiliary magnetic pole (i.e., the length of a gap). In the STO, in order to achieve magnetization in the direction perpendicular to the film surface by a gap magnetic field ($H_{gap}$), when at least a total of the perpendicular magnetic anisotropy (Hk) and the gap magnetic field ($H_{gap}$) is higher than a demagnetizing field ($H_{dia}$) ($H_{dia}$<$Hk+H_{gap}$), magnetization in the direction perpendicular to the film surface can be achieved.

On the other hand, the demagnetizing field ($H_{dia}$) is large, it is difficult to arrange the spin injection layer and the oscillation layer parallel to each other in the direction of the gap magnetic field ($H_{gap}$), and thus the spin torque efficiency is reduced. Thus, the magnetization rotation of the oscillation layer reduces, resulting in non-achievement of appropriate oscillation frequency.

A well-known method to examine the perpendicular magnetic anisotropy includes a method of derivation of magnetic anisotropy constants by the torque method. In order to simply examine it, an external magnetic field is applied in the direction perpendicular to the surface of a thin film sample using a vibrating sample magnetometer (VSM) to measure the anisotropy field. When the anisotropy field (Hk) does not have anisotropy in the direction perpendicular to the film surface, the saturation magnetic field is 4 nMs because an inner magnetic field (demagnetizing field ($H_{dia}$)) of a magnetic body is equal to an external magnetic field ($H_{ext}$). When the anisotropy is changed by a change in the material composition (i.e., when a certain material has magnetic anisotropy in the perpendicular direction), magnetization of the magnetic body is saturated by an external magnetic field less than 4 $\pi$Ms. A value obtained by subtracting the difference of 4 $\pi$Ms from the saturation magnetic field corresponds to the anisotropy field (Hk).

When a certain material has perpendicular magnetic anisotropy, to be exact, depending on the time when an axis of easy magnetization switches from the film in-plane direction to the direction perpendicular to the film surface, the film is designated as a perpendicular magnetization film or an in-plane magnetization film. Here, the material composition in which the anisotropy field (Hk) measured by the above method for descriptive purposes is positive is referred to as "material showing perpendicular magnetic anisotropy". In the high-frequency assisted head, as described above, the magnetic anisotropy including the magnetic field ($H_{gap}$) by the main magnetic pole and the shape anisotropy of the STO is important. This is because it is difficult to directly relate the anisotropy field (Hk) measured from a thin film sample with the anisotropy field (Hk) required in the STO element of the high-frequency assisted head.

As the Hk (anisotropy field) showing perpendicular magnetic anisotropy is larger, the spin torque oscillation can be easily achieved. Further, as the magnetovolume of the SIL (saturation magnetization (Ms)×thickness (t)) is larger, the spin torque oscillation can be easily achieved. This is because the direction of a magnetic moment is stable to the spin torque reaction during oscillation. Therefore, the SIL can be formed into a thin film as the anisotropy field (Hk) is larger. As the anisotropy field (Hk) is smaller, the film needs to be thicker. Basically, as the film thickness of the second layer is larger, the anisotropy field (Hk) can be increased. If the film thickness of the Heusler layer is relatively decreased, the spin polarizability (Po) is reduced. Therefore, the film thickness needs to be adjusted in order to achieve advantages of the spin polarizability (Po) and advantages of the anisotropy field (Hk).

Hereinafter, the embodiments will be described with reference to the drawings.

FIG. 1 is a view showing an exemplary configuration of a magnetic head according to one embodiment.

A magnetic head 30 according to the embodiment includes a reproducing head portion 40 and a write head portion 50. The reproducing head portion 40 has a magnetic reproducing element (not shown), an exciting coil 25, and a leading shield 24. The write head portion 50 has a main magnetic pole 21 as a recording magnetic pole, a trailing shield (auxiliary magnetic pole) 22 which refluxes a magnetic field from the main magnetic pole 21, a spin torque oscillator 20 formed between the main magnetic pole 21 and the trailing shield (auxiliary magnetic pole) 22, and an exciting coil 23.

The spin torque oscillator 20 includes, for example, a spin injection layer 3 formed on the main magnetic pole 21, a nonmagnetic intermediate layer 2 formed on the spin injection layer 3, and an oscillation layer 1 formed on the nonmagnetic intermediate layer 2.

Although it is not illustrated, the main magnetic pole 21 may be formed after stacking the oscillation layer 1, the nonmagnetic intermediate layer 2, and the spin injection layer 3 on the main magnetic pole 21.

Although it is not illustrated, the main magnetic pole 21 may be formed after stacking the spin injection layer 3, the nonmagnetic intermediate layer 2, and the oscillation layer 1 on the auxiliary magnetic pole 22.

In the write head portion 50 of the magnetic head 30 for high-frequency assisted recording, an external magnetic field perpendicular to the film surface is applied by a gap magnetic field between the main magnetic pole 21 and the trailing shield 22, an axis nearly perpendicular to the film surface is used as a rotation axis, the oscillation layer precesses, and then a high-frequency magnetic field is generated outside. The high-frequency magnetic field generated from the spin torque oscillator is overlapped with the magnetic field applied from the main magnetic pole, so that writing can be performed on the corresponding magnetic recording medium with higher recording density.

Figure 2:
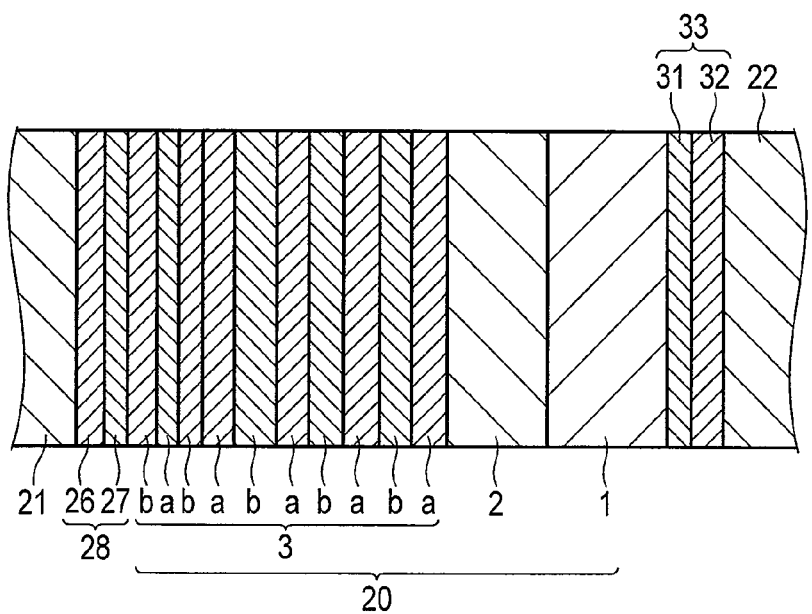
FIG. 2 is a schematic view showing another example of a magnetic head according to one embodiment.

FIG. 2 is a view schematically showing an exemplary structure of the spin torque oscillator used in the embodiment.

As illustrated, the spin torque oscillator 20 is formed on, for example, the main magnetic pole 21 through an underlayer 28 including an Ta layer 26 having a thickness of 2 nm and a Pt layer 27 having a thickness of 2 nm. A first metal layer b of a Heusler alloy and a second metal layer a containing at least one of Pt, Pd, and Ni are stacked two times or more repeatedly. In this case, the layers are formed so as to have a structure in which the layers are stacked in the order of baba-bababa from the side of the main magnetic pole 21. A cap layer 33 formed of a copper layer 31 having a thickness of 2 nm and a Ta layer 32 having a thickness of 3 nm can be further formed between the spin torque oscillator 20 and the auxiliary magnetic pole 22.

The oscillation layer (FGL) is formed of a magnetic alloy consisting of at least one selected from Fe, Co, and Ni.

From the viewpoint of generating a high-frequency magnetic field, a material having a high saturation magnetic flux density (Bs) is used. As the oscillation layer (FGL), for example, a Fe alloy may be used. Usable examples thereof include Fe—Co—Ni and Fe—Co alloys. From the viewpoint of the high Bs, the Fe alloy may have a Fe composition ratio of 30 atomic percent or more. Further, the FGL may include a stacked structure of a magnetic alloy. Other nonmagnetic metal elements may be added to the Fe alloy. If an element selected from Al, Si, Cu, Ge, Ga, and Mn is added to, particularly the Fe—Co alloy at a concentration (composition ratio of 30 atomic percent or less), soft magnetic characteristics are improved and the damping constant which inhibits the oscillation of the spin torque can be simultaneously reduced. The FGL is preferably as thick as possible in order to obtain a high-frequency magnetic field. However, if the magnetovolume increases, it is difficult to oscillate the spin torque. Therefore, the film thickness range to obtain an oscillation is from 5 to 30 nm.

As the nonmagnetic intermediate layer, at least one metal layer selected from the group consisting of Al, Cu, Au, Ag, Al, Pd, Os, and Ir, a nonmagnetic alloy layer using the metal, or a stacked layer thereof may be used. It is preferable to make the thickness of the nonmagnetic intermediate layer shorter than the spin diffusion length so that the spin torque from the spin injection layer (SIL) is transmitted to the FGL. The spin diffusion length varies depending on the substance and it tends to be 10 nm or more. Thus, the thickness of the nonmagnetic intermediate layer can be set to 10 nm or less. On the other hand, if it becomes thinner than 0.5 nm, a strong magnetic coupling between the FGL and the spin injection layer (SIL) is given, resulting in inhibition of oscillation. Thus, the thickness can be se to 0.5 nm or more.

The lower limit of the film thickness of the Heusler layer is required to be a thickness level in which high spin polarization (Po) properties of the Heusler alloy are not lost by environmental effects. Specifically, the film thickness is preferably 0.3 nm or more. On the other hand, the upper limit is required to be a sufficiently thin film thickness level which can produce an effect of the artificial lattice and the second layer. Specifically, if it exceeds 3.5 nm, bulk properties appear and perpendicular magnetic anisotropy by the effect of the artificial lattice is rapidly lost. Therefore, the thickness is preferably 3.5 nm or less.

The film thickness of the first metal layer is preferably thicker in order to obtain the anisotropy field (Hk). From the viewpoint of spin polarization (Po), the film thickness is preferably thinner. In order to clearly give the anisotropy field (Hk), it is necessary to set the film thickness to greater than 0.2 nm. When the thickness is thinner than the range, the properties of the artificial lattice are lost and it serves as like an additive to the Heusler alloy. On the other hand, even if a film having a thickness greater than 1.5 nm is formed, the anisotropy field (Hk) hardly increases. Thus, it is preferably 1.5 nm or less.

The artificial lattice using the Heusler alloy can be stacked together with the spin injection layer (SIL) which is not the Heusler alloy. In this case, it is possible to achieve high anisotropy field (Hk) of another SIL and high spin polarizability (Po) of a Heusler artificial lattice. Thus, a higher effect can be obtained.

The stacking order is, for example, as follows: an underlayer; a spin injection layer (SIL) which is not a Heusler alloy; a spin injection layer (SIL) containing a Heusler alloy; a nonmagnetic intermediate layer; an oscillation layer (FGL); and a cap on a main magnetic pole (MP) or the order in which the SIL is replaced with FGL: an underlayer; an oscillation layer (FGL); a nonmagnetic intermediate layer; a spin injection layer (SIL) containing a Heusler alloy; a spin injection layer (SIL) which is not a Heusler alloy; and a cap. The SIL including the Heusler alloy can be formed at an interface with the nonmagnetic intermediate layer. In this regard, Pt and Pd generally have a high level of strong spin scattering effect, thus when the artificial lattice using the Heusler alloy is stacked together with the SIL which is not the Heusler alloy, this results in a great reduction in the spin torque and MR. Accordingly, it is not preferable to use Pt as the nonmagnetic intermediate layer. Therefore, when the stacking order of the SIL and the FGL is reversed, general Cu (and the like and other examples will be shown) has a different lattice matching between artificial lattices including the nonmagnetic intermediate layer and Heusler. Thus, in the Heusler material and Pt, Pd, and Ni artificial lattices, it is considered that the optimal film-thickness ratio to obtain the perpendicular magnetic anisotropy differs from one another.

As the SIL which is not the Heusler alloy, for example, Co—Pt and Fe—Pt alloys or Co/Pt, Co/Pd, Co/Ni, and FeCo/Ni artificial lattices may be used. Since it is important to stabilize the direction of the magnetization during oscillation of the spin torque, the film thickness of the SIL is preferably thicker. However, from the design restrictions to form the whole STO into a thin film, it is necessary to form a film as thin as possible. For example, if the film thickness is 5 nm or more, it is possible achieve stable oscillation. Further, the SIL may include a soft magnetic layer between the nonmagnetic intermediate layers. If a FeCo alloy, a half metal alloy or the like is formed, the spin torque efficiency is improved and the drive voltage is decreased, resulting in an improvement in the reliability. On the other hand, if a soft magnetic layer is stacked and formed, the perpendicular magnetic anisotropy is reduced as a whole. Accordingly, it is necessary to limit the film thickness to a thickness level in which the perpendicular magnetic anisotropy is not significantly inhibited. The film thickness varies depending on the strength of the perpendicular magnetic anisotropy of the SIL and the film thickness. If the film thickness does not exceed the thickness of the SIL, it is possible to obtain the perpendicular magnetic anisotropy at a certain level.

In the embodiment, a spin torque oscillator having a low critical current density can be used as a source of a high-frequency field. Accordingly, it is possible to reverse the magnetization of the magnetic recording medium in a large high-frequency magnetic field.

FIG. 3 is a main part perspective view illustrating an outline configuration of a magnetic recording/reproducing device on which the magnetic head according to the embodiment can be mounted.

Hence, the magnetic recording/reproducing device 150 is a system employing a rotary actuator. In FIG. 3, a recording medium disk 180 is mounted onto a spindle 152 and rotated in a direction indicated by an arrow A with a motor (not shown) in response to a control signal from a drive control portion (not shown). Alternatively, the magnetic recording/reproducing device 150 may be provided with a plurality of medium disks 180.

A head slider 103 to perform recording/reproduction of information to be stored in the medium disk 180 has the configuration as described above regarding FIG. 4 and is mounted on the distal end of a filmy suspension 154. Here, the magnetic head according to the embodiment is installed near the distal end of the head slider 103.

If the medium disk 180 rotates, the surface (ABS) of the head slider 103 which faces the medium is held with a predetermined floating amount from the surface of the medium disk 180. Alternatively, the head slider may be in contact with the medium disk 180, which is called "contact run type".

The suspension 154 is connected to one end of an actuator arm 155 including a bobbin portion for supporting a driving coil (not shown). A voice coil motor 156 as a kind of a linear motor is formed at the other end of the actuator arm 155. The voice coil motor 156 is formed by the driving coil (not shown) wound on the bobbin portion of the actuator arm 155, and a magnetic circuit including a permanent magnet and counter yoke arranged to face each other so as to sandwich the coil.

The actuator arm 155 is supported by ball bearings (not shown) provided at the upper portion and the lower portion of a spindle 157 so as to be rotated and slid freely by the voice coil motor 156.

FIG. 4 is a schematic view showing an example of a magnetic head assembly according to one embodiment.

FIG. 4 is an enlarged perspective view illustrating a portion of the magnetic head assembly positioned at the distal end side thereof from the actuator arm 155, as viewed from the side of the disk. Hence, the magnetic head assembly 160 has the actuator arm 155 with the bobbin portion supporting the driving coil and the like. The suspension 154 is connected to the one edge of the actuator arm 155.

The head slider 103 including the magnetic head 30 shown in FIG. 4 is attached to the distal end of the suspension 154. The suspension 154 includes a lead wire 164 for writing/reading signals, where the lead wire 164 is electrically connected to the respective electrodes of the magnetic head embedded in the head slider 103. In the drawing, reference numeral 165 denotes an electrode pad of the magnetic head assembly 160.

EXAMPLES

Hereinafter, the embodiments will be more specifically described with respect to Examples.

Example 1

In this example, sputtering was performed under the conditions (argon gas pressure of 0.3 Pa, room temperature) using a DC magnetron sputtering system (manufactured by Anelva) to form a 3 nm-thick Ta layer and a 2 nm-thick Pt layer on a main magnetic pole comprised of an FeCo alloy in this order and an underlayer was obtained.

Thereafter, a Co—Fe—Mn—Si alloy target was used and sputtered under the conditions (argon gas pressure of 0.3 Pa, room temperature) to form a Co2 ($Fe_{0.5}Mn_{0.5}$) Si layer (hereinafter referred to as "CFMS film") having a thickness of 0.6 nm. Subsequently, a Pt target was used and sputtered under the conditions (argon gas pressure of 0.3 Pa, room temperature) to stack a 1.0 nm-thick Pt layer on the CFMS film. The stacking process of the CFMS film and the Pt layer was further repeated 4 times to form four 0.6 nm-thick CFMS films and five 1.0 nm-thick Pt layers and an SIL layer was obtained. Thereafter, the SIL layer was subjected to a heat treatment at 290° C. for 1 hour.

The obtained CFMS film was identified as (110) orientation of Heusler alloy by X ray reflection and electron diffraction.

The magnetic properties of the CFMS film were measured before and after the heat treatment. The M-H curves of the SIL layer are shown in FIG. 5.

In FIG. 5, reference numeral 101 denotes an M-H curve before the heat treatment and reference numeral 102 denotes an M-H curve after the heat treatment.

Thus, changes in the value of the magnetization before and after the heat treatment characteristic to the Heusler alloy were observed and it was confirmed that sufficient regulation was achieved.

Further, the anisotropy field (Hk) of an artificial lattice film of the CFMS film and the Pt layer was measured.

A nonmagnetic intermediate layer of Cu having a thickness of 3 nm and a layer of Fe having a thickness of 10 nm, 40 atomic % of Co, and 15 atomic % of Al as the FGL were stacked onto the SIL layer to obtain a spin torque oscillator having the same configuration as FIG. 2. Then, a high-frequency assisted magnetic head having the same configuration as FIG. 1 was produced.

Thereafter, oscillation characteristics in a state where the recording current was applied to the coil formed in the main magnetic pole were detected from changes of resistance of the STO, and the oscillation drive voltage was calculated.

The obtained results are shown in Table 1 below.

Examples 2 to 4

A spin torque oscillator was formed in the same manner as described in Example 1 except that the thickness of the Pt layer of the SIL layer was changed as shown in Table 1 below and a high-frequency assisted magnetic head was produced using it.

Further, the CFMS film was subjected to X ray reflection, electron diffraction, and measurement in the same manner as described in Example 1. In each case, the film was determined as (110) orientation of Heusler alloy. Further, the magnetic properties of the CFMS film were measured before and after the heat treatment, and changes in the value of the magnetization before and after the heat treatment characteristic to the Heusler alloy were observed and it was confirmed that sufficient regulation was achieved.

Further, the anisotropy field (Hk) of an artificial lattice film of the CFMS film and the Pt layer was measured in the same manner as described in Example 1 and the oscillation drive voltage of the high-frequency assisted magnetic head was calculated.

The obtained results are shown in Table 1 below.

TABLE 1

| | | Film configuration [material thickness/material thickness] × number of stacks | Hk (kOe) | Drive voltage (mV) |
|---|---|---|---|---|
| Example | 1 | [CFMS 0.6 nm/Pt 1.0 nm] × 5 times | 3.1 | 50 |
| | 2 | [CFMS 0.6 nm/Pt 0.6 nm] × 5 times | 3.0 | 40 |
| | 3 | [CFMS 0.6 nm/Pt 0.4 nm] × 5 times | 2.4 | 50 |
| | 4 | [CFMS 0.6 nm/Pt 0.2 nm] × 5 times | 0.6 | — |

As shown in Table 1, when the thickness of Pt was 0.2 nm, the anisotropy field (Hk) was a value as low as 0.6 kOe. When the thickness of Pt was 0.4 nm or more, a value in the kOe order was obtained.

Examples 5 to 8, and Comparative Example 1

A spin torque oscillator was formed in the same manner as described in Example 1 except that the thickness of the CFMS film of the SIL layer was changed as shown in Table 2 below and a high-frequency assisted magnetic head was produced using it.

Further, the CFMS film was subjected to X ray reflection, electron diffraction, and measurement in the same manner as described in Example 1. In each case, the film was determined as (110) orientation of Heusler alloy. Further, the magnetic properties of the CFMS film were measured before and after the heat treatment, and changes in the value of the magnetization before and after the heat treatment characteristic to the Heusler alloy were observed and it was confirmed that sufficient regulation was achieved.

Further, the anisotropy field (Hk) of an artificial lattice film of the CFMS film and the Pt layer was measured in the same manner as described in Example 1 and the oscillation drive voltage of the high-frequency assisted magnetic head was calculated.

The results of the obtained anisotropy fields (Hk) and the oscillation drive voltages are shown in Table 2 below.

TABLE 2

| Film configuration [material thickness/material thickness] × number of stacks | | Hk (kOe) | Drive voltage (mV) |
|---|---|---|---|
| Example 5 | [CFMS 0.6 nm/Pt 1.5 nm] × 5 times | 5.0 | 50 |
| Example 6 | [CFMS 1.0 nm/Pt 1.5 nm] × 5 times | 4.0 | 40 |
| Example 7 | [CFMS 2.0 nm/Pt 1.5 nm] × 5 times | 3.0 | 50 |
| Example 8 | [CFMS 3.5 nm/Pt 1.5 nm] × 5 times | 2.5 | 50 |
| Comparative Example 1 | [CFMS 4.0 nm/Pt 1.5 nm] × 5 times | 0.4 | — |

As shown in Table 2, when the thickness of the CFMS layer reached 4 nm, the anisotropy field (Hk) exhibited a value close to the margin of error. When the thickness was 3.5 nm or less, a value in the kOe order was obtained.

Examples 9 to 13, and Comparative Example 2

A spin torque oscillator was formed in the same manner as described in Example 1 except that the configuration of the SIL layer was changed as shown in Table 3 below and a high-frequency assisted magnetic head was produced using it.

Further, the CFMS film was subjected to X ray reflection, electron diffraction, and measurement in the same manner as described in Example 1. In Examples 9 to 13, the CFMS film was determined as (110) orientation of Heusler alloy. Further, the magnetic properties of the CFMS film were measured before and after the heat treatment, and changes in the value of the magnetization before and after the heat treatment characteristic to the Heusler alloy were observed in Examples 9 to 13 and it was confirmed that sufficient regulation was achieved.

Further, the anisotropy field (Hk) of an artificial lattice film of the CFMS film and the Pt layer was measured in the same manner as described in Example 1 and the oscillation drive voltage of the high-frequency assisted magnetic head was calculated.

The results of the obtained anisotropy fields (Hk) and the oscillation drive voltages are shown in Table 3 below.

TABLE 3

| Film configuration [material thickness/material thickness] × number of stacks | | Hk (kOe) | Drive voltage (mV) |
|---|---|---|---|
| Example 9 | [CFMS 0.4 nm/Pt 0.6 nm] × 15 times | 3.7 | 50 |
| Example 10 | [CFMS 0.4 nm/Pt 1 nm] × 15 times | 4.5 | 40 |
| Example 11 | [CFMS 0.6 nm/Pt 1 nm] × 15 times | 3.1 | 50 |
| Example 12 | [Co 0.4 nm/Pt 0.3 nm] × 10 times/ [CFMS 0.4 nm/Pt 0.6 nm] × 10 times | 8 | 30 |
| Example 13 | [CFMS 0.4 nm/Pt 0.6 nm] × 15 times/ CFMS 0.4 nm | 3.7 | 40 |
| Comparative Example 2 | [Co 0.4 nm/Pt 0.3 nm] × 10 times | 10.0 | 60 |

As shown in Table 3, in the variations of the configuration of the SIL layer, the magnetic film thickness (Ms*t) of the FGL is higher than those in the examples of Tables 1 and 2, and the spin torque acting on the SIL layer becomes larger. Thus, higher spin torque resistance of the film is exhibited by increasing the number of times of stacking the SIL layer to 15.

In Table 3, in the case of the SIL using the artificial lattice of the Heusler, driving at a low voltage was achieved. Further, when stacked with the conventional Co/Pt artificial lattice, the drive voltage could be decreased because of an increase in the anisotropy field (Hk). As shown in Example 12, when a portion at the interface of the nonmagnetic intermediate layer is used as a [CFMS/Pt] artificial lattice, and the remained artificial lattice located distally as viewed from the nonmagnetic intermediate layer is used as a [Co/Pt] artificial lattice, it is possible to achieve the anisotropy field (Hk) at a high [Co/Pt] ratio and the spin injection efficiency at a high [CFMS/Pt] ratio. As shown in Example 13, when the end of the artificial lattice at the interface of the nonmagnetic intermediate layer was stopped at the CFMS, the anisotropy field (Hk) was not changed and higher spin torque was produced. As a result, the driving current decreased.

The embodiments of the present invention have been herein above explained. However, the embodiments are presented as examples, and are not intended to limit the scope of the invention. These new embodiments can be embodied in various other forms, and various kinds of omissions, replacements, and changes can be made without deviating from the gist of the invention. These embodiments and the modifications thereof are included in the scope and the gist of the invention, and are included in the invention described in the claims and the scope equivalent thereto.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
    a main magnetic pole which applies a record magnetic field to a magnetic recording medium;
    an auxiliary magnetic pole configured to form a magnetic circuit together with the main magnetic pole; and
    a spin torque oscillator formed between the main magnetic pole and the auxiliary magnetic pole;
    wherein the spin torque oscillator includes a spin injection layer formed on one of the main magnetic pole and the auxiliary magnetic pole, a nonmagnetic intermediate layer formed on the spin injection layer, and an oscillation layer formed on the nonmagnetic intermediate layer,
    the spin injection layer has an artificial lattice film obtained by stacking a first metal layer of a Heusler alloy and a second metal layer which is formed on the first metal layer and includes at least one of platinum, palladium, and nickel two times or more repeatedly, and
    the first metal layer has a thickness of 0.3 to 3.5 nm.

2. The magnetic head according to claim 1, wherein the first metal layer is represented by the composition formula ABC:
    wherein A is 40 to 60 atomic % of Co, B is 20 to 30 atomic % of an Fe—Mn alloy, C is 20 to 30 atomic % of Si, and the total of A, B, and C is 100 atomic % or
    A is 40 to 60 atomic % of Co, B is 20 to 30 atomic % of Mn, C is 20 to 30 atomic % of Si, and the total of A, B, and C is 100 atomic % or
    A is 40 to 60 atomic % of Co, B is 20 to 30 atomic % of Fe, C is 20 to 30 atomic % of an Al—Si alloy, and the total of A, B, and C is 100 atomic % or
    A is 40 to 60 atomic % of Co, B is 20 to 30 atomic % of Fe, C is 20 to 30 atomic % of a Ga—Ge alloy, and the total of A, B, and C is 100 atomic %.

3. The magnetic head according to claim 1, wherein the second metal layer has a thickness of greater than 0.2 nm and not more than 1.5 nm.

4. A magnetic recording/reproducing device comprising:
- a magnetic head including a main magnetic pole which applies a record magnetic field to a magnetic recording medium;
- an auxiliary magnetic pole configured to form a magnetic circuit together with the main magnetic pole; and
- a spin torque oscillator formed between the main magnetic pole and the auxiliary magnetic pole;
- wherein the spin torque oscillator includes a spin injection layer formed on one of the main magnetic pole and the auxiliary magnetic pole, a nonmagnetic intermediate layer formed on the spin injection layer, and an oscillation layer formed on the nonmagnetic intermediate layer,
- the spin injection layer has an artificial lattice film obtained by stacking a first metal layer of a Heusler alloy and a second metal layer which is formed on the first metal layer and includes at least one of platinum, palladium, and nickel two times or more repeatedly, and
- the first metal layer has a thickness of 0.3 to 3.5 nm.

5. The magnetic recording/reproducing device according to claim 4, wherein the first metal layer is represented by the composition formula ABC:
- wherein A is 40 to 60 atomic % of Co, B is 20 to 30 atomic % of an Fe—Mn alloy, C is 20 to 30 atomic % of Si, and the total of A, B, and C is 100 atomic % or
- A is 40 to 60 atomic % of Co, B is 20 to 30 atomic % of Mn, C is 20 to 30 atomic % of Si, and the total of A, B, and C is 100 atomic % or
- A is 40 to 60 atomic % of Co, B is 20 to 30 atomic % of Fe, C is 20 to 30 atomic % of an Al—Si alloy, and the total of A, B, and C is 100 atomic % or
- A is 40 to 60 atomic % of Co, B is 20 to 30 atomic % of Fe, C is 20 to 30 atomic % of a Ga—Ge alloy, and the total of A, B, and C is 100 atomic %.

6. The magnetic recording/reproducing device according to claim 4, wherein the second metal layer has a film thickness of greater than 0.2 nm and not more than 1.5 nm.

* * * * *